(12) United States Patent
Takae

(10) Patent No.: US 9,360,963 B2
(45) Date of Patent: Jun. 7, 2016

(54) PORTABLE TERMINAL AND OPERATION INHIBITION AREA CONTROL METHOD

(71) Applicant: KYOCERA Corporation, Kyoto-shi, Kyoto (JP)

(72) Inventor: Osamu Takae, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/411,894

(22) PCT Filed: Jun. 25, 2013

(86) PCT No.: PCT/JP2013/067337
§ 371 (c)(1),
(2) Date: Dec. 29, 2014

(87) PCT Pub. No.: WO2014/002985
PCT Pub. Date: Jan. 3, 2014

(65) Prior Publication Data
US 2015/0148105 A1    May 28, 2015

(30) Foreign Application Priority Data
Jun. 27, 2012    (JP) .................................. 2012-144034

(51) Int. Cl.
*H04M 1/00*    (2006.01)
*G06F 3/041*    (2006.01)
(Continued)

(52) U.S. Cl.
CPC ............ *G06F 3/0416* (2013.01); *G06F 3/0481* (2013.01); *G06F 3/04886* (2013.01); *H04M 1/0266* (2013.01); *G06F 2203/04803* (2013.01)

(58) Field of Classification Search
CPC ...................... H04M 1/72519; H04M 1/72583; G06F 3/0048; G06F 3/04817
USPC .................... 455/566, 556.1, 556.2; 345/173; 348/333.01–333.13; 178/18.01
See application file for complete search history.

(56) References Cited

U.S. PATENT DOCUMENTS 7,564,448 B2 *  7/2009  Yi ........................ G06F 3/04886
                                                        178/18.01
7,782,308 B2 *  8/2010  Shin .................... G06F 3/04883
                                                        345/173

(Continued)

FOREIGN PATENT DOCUMENTS

JP    2000-039964 A    2/2000
JP    2008-021000 A    1/2008

(Continued)

OTHER PUBLICATIONS

International Search Report dated Oct. 8, 2013, issued in counterpart International application No. PCT/JP2013/067337.

*Primary Examiner* — Sonny Trinh
(74) *Attorney, Agent, or Firm* — Procopio, Cory, Hargreaves & Savitch LLP

(57) ABSTRACT

A mobile phone 10 comprises a display 14 that is provided on a case 12 so as to be rendered as a narrow frame, a touch panel 16 that is provided on the display 14, etc. An operation inhibition area (80a, 80b) is set to the left side and the right side of a touch effective area of the touch panel 16, respectively. If the operation inhibition area is touched in a state where an arbitrary function is being executed, for example, the operation inhibition area and a cancellation icon (82) are displayed on the display 14. If a temporary cancellation operation is performed at this time, the operation inhibition area is temporarily canceled.

9 Claims, 9 Drawing Sheets

(51) Int. Cl.
   *G06F 3/0481* (2013.01)
   *G06F 3/0488* (2013.01)
   *H04M 1/02* (2006.01)

(56) References Cited

U.S. PATENT DOCUMENTS 7,916,125 B2 * 3/2011 Shin .................... G06F 3/04883
                                                    345/104
7,999,872 B2 * 8/2011 Suzuki ............... H04N 5/23293
                                                    345/173
8,872,958 B2 * 10/2014 Suzuki ............... H04N 5/23293
                                                    348/333.02
8,896,562 B2 * 11/2014 Horiguchi ............... G06F 3/041
                                                    178/18.01
2008/0012836 A1   1/2008 Yokota
2011/0102357 A1   5/2011 Kajitani

FOREIGN PATENT DOCUMENTS

JP   2009-009424 A   1/2009
JP   2010-009335 A   1/2010

* cited by examiner

FIG. 6 TEMPORARY CANCELLATION TABLE

| SCREEN INFORMATION | NUMBER OF TIMES |
|---|---|
| MEMO PAD | 2 |
| E-MAIL PREPARING | 1 |
| BROWSER | 1 |
| ⋮ | ⋮ |

PORTABLE TERMINAL AND OPERATION INHIBITION AREA CONTROL METHOD

FIELD OF ART

The present invention relates to a portable terminal and an operation inhibition area control method, and more specifically, a portable terminal and an operation inhibition area control method that an operation inhibition area is set in a touch operation effective area of a touch panel.

BACKGROUND ART

A portable terminal that an operation inhibition area is set in a touch operation effective area of a touch panel is known. A touch screen is constituted by a touch panel and a liquid crystal panel in a certain portable terminal. Furthermore, an inhibition area is set to the touch panel, and an icon is displayed on the liquid crystal panel. Then, displaying of the icon is non-displayed if there is an erroneous input to the inhibition area due to a touch of finger or the like.

SUMMARY OF THE INVENTION

Problem to be Solved by the Invention

However, if the above-described portable terminal is applied to a mobile phone, following problems occur. In a recent mobile phone, main operations are performed using a touch screen. Therefore, many icons (GUI) become to be displayed on the touch screen.

If the displaying of the icon remains disappearing due to an erroneous input, for example, it becomes impossible to operate the mobile phone. Furthermore, if it is made not to display an icon in the inhibition area, the number of the icons that can be displayed become fewer. Furthermore, if an icon is displayed in the inhibition area, it is impossible to perform a touch operation to the icon.

Therefore, it is a primary object of the present invention to provide a novel portable terminal and operation inhibition area control method.

It is another object of the present invention to provide a portable terminal and operation inhibition area control method, capable of easily canceling an operation inhibition area.

Means for Solving the Problem

A first aspect of the invention is a portable terminal that has a case, a display portion provided on the case so as to be rendered as a narrow frame and a touch panel that receives a touch operation, wherein an operation inhibition area is set in at least a part of a periphery of a touch effective area, comprising: a display processing module operable to display the operation inhibition area when the operation inhibition area is touched; and cancellation module operable to cancel at least a part of the operation inhibition area when a cancellation operation is performed in a state where the operation inhibition area is being displayed.

A second aspect of the invention is an operation inhibition area control method in a portable terminal that has a case, a display portion provided on the case and a touch panel that receives a touch operation, wherein an operation inhibition area is set in at least a part of a periphery of a touch effective area, a processor of the portable terminal performs following steps of: displaying the operation inhibition area when the operation inhibition area is touched; and canceling at least a part of the operation inhibition area when a cancellation operation is performed in a state where the operation inhibition area is being displayed.

Advantage of the Invention

According to an embodiment of the invention, it is possible to cancel the operation inhibition area easily.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a schematic view showing an example of structure of a temporary cancellation table that is stored in a RAM shown in FIG. 1.

DESCRIPTION OF EMBODIMENTS

First Embodiment

Figure 1:
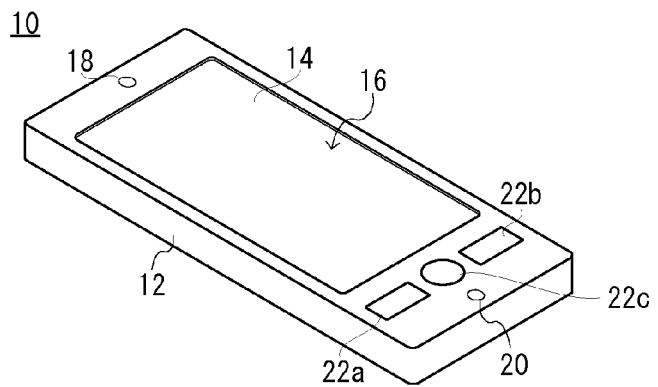
FIG. 1 an appearance view showing a mobile phone according to an embodiment of the invention.

With referring to FIG. 1, a mobile phone 10 of an embodiment according to the present invention is a smartphone as an example, and includes a longitudinal flat rectangular case 12. However, it is pointed out in advance that the present invention can be applied to an arbitrary portable terminal such as a tablet terminal, a PDA, etc.

A display 14 that functions as a displaying portion and may be a liquid crystal, organic EL or the like is provided on a main surface (front surface) of the case 12 so as to be rendered as a narrow frame. A touch panel 16 is provided on the display 14. Therefore, in the mobile phone 10 of this embodiment, the most part of an input operation excepting an input by an operation of a hardware key described later is performed through the touch panel 16.

A speaker 18 is housed in the case 12 at one end of a longitudinal direction on a side of the front surface, and a microphone 20 is housed at the other end in the longitudinal direction on the side of the front surface. As hardware keys constituting an input operating module together with the touch panel 16, a call key 22a, an end key 22b and a menu key 22c are provided, in this embodiment.

For example, a user can input a telephone number by performing a touch operation by the touch panel 16 to a dial key (not shown) displayed on the display 14, and start a telephone conversation by operating the call key 22a. If the end key 22b is operated, the telephone conversation can be ended. In addition, by long-depressing the end key 22b, it is possible to turn on/off a power supply of the mobile phone 10.

If the menu key 22c is operated, a menu screen is displayed on the display 14, and in such a state, by performing a touch operation by the touch panel 16 to software keys, menu icons or the like (both not shown) being displayed on the display 14, it is possible to select a menu and to determine such a selection.

Figure 2:
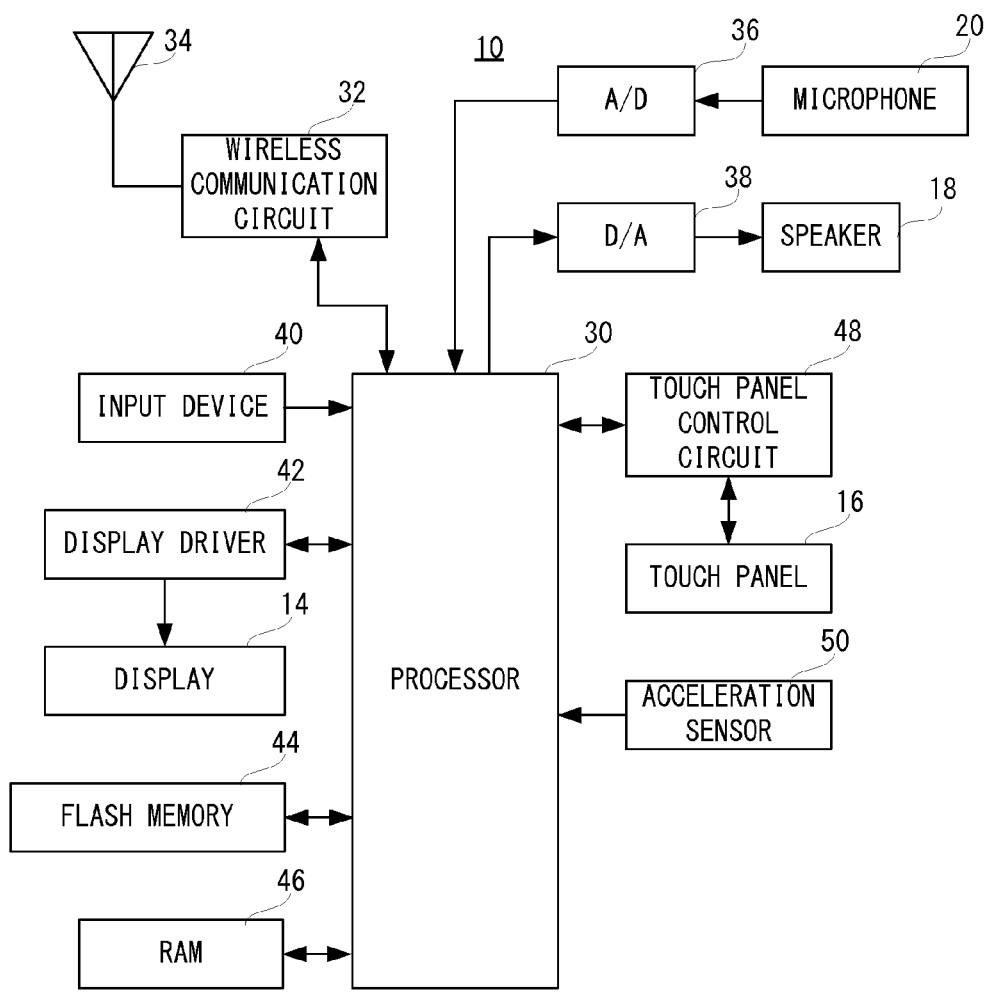
FIG. 2 is a schematic view showing electric structure of the mobile phone shown in FIG. 1.

With referring to FIG. 2, the mobile phone 10 of the embodiment shown in FIG. 1 includes a processor 30 that is called a computer or CPU. The processor 30 is connected with a wireless communication circuit 32, an A/D converter 36, a D/A converter 38, an input device 40, a display driver 42, a flash memory 44, a RAM 46, a touch panel control circuit 48, an acceleration sensor 50, etc.

The processor 30 is in charge of a whole control of the mobile phone 10. A whole or a part of a program set in advance in the flash memory 44 is, in use, developed or loaded into the RAM 46 that functions as a storing module, and the processor 30 operates in accordance with the program developed in the RAM 46. In addition, the RAM 46 is further used as a working area or buffer area for the processor 30.

The input device 40 includes the touch panel 16 and the hardware keys 22a-22c shown in FIG. 1, and constitutes an operating module or inputting module. Information (key data) of the hardware key that the user operated is input to the processor 30.

The wireless communication circuit 32 is a circuit for transmitting and receiving a radio wave for a telephone conversation, an e-mail, etc. In the embodiment, the wireless communication circuit 32 is a circuit for performing wireless communication in a CDMA system. If the user instructs an outgoing call (telephone call) by operating the hardware key 22, for example, the wireless communication circuit 32 performs telephone call processing under instructions of the processor 30 and outputs a telephone call signal via the antenna 34. The telephone call signal is transmitted to a telephone at the other end of line through a base station and a communication network. Then, when incoming call processing is performed in the telephone at the other end of line, a communication-capable state is established and the processor 30 performs telephone conversation processing.

Specifically describing normal telephone conversation processing, a modulated voice signal sent from a telephone at the other end of line is received by the antenna 34. The modulated voice signal that is received is subjected to demodulation processing and decode processing by the wireless communication circuit 32. A received voice signal obtained through such processing is converted into a voice signal by the D/A converter 38 to be output from the speaker 18. On the other hand, a sending voice signal taken-in through the microphone 20 is converted into voice data by the A/D converter 36 to be applied to the processor 30. The voice data is subjected to encode processing and modulation processing by the wireless communication circuit 32 under instructions of the processor 30 to be output via the antenna 34. Therefore, the modulated voice signal is transmitted to the telephone at the other end of line.

When the telephone call signal from a telephone at the other end of the line is received by the antenna 34, the wireless communication circuit 32 notifies the processor 30 of the incoming call. In response thereto, the processor 30 displays on the display 14 sender information (telephone number and so on) described in the incoming call notification by controlling the display driver 42. In addition, according to the above-described processing, the processor 30 outputs from the speaker 18 a ringtone (may be also called as a ringtone melody, a ringtone voice).

Then, if the user performs an answering operation by using the call key 22a included in the input device 40, the wireless communication circuit 32 performs telephone incoming processing under instructions of the processor 30. Furthermore, when the communication-capable state is established, the processor 30 performs the above-described telephone conversation processing.

If the telephone conversation ending operation is performed by the end key 22b (FIG. 1) included in the input device 40 after a state is changed to the communication-capable state, the processor 30 transmits a telephone conversation ending signal to the telephone at the other end of line by controlling the wireless communication circuit 32. Then, after transmission of the telephone conversation ending signal, the processor 30 terminates the telephone conversation processing. Furthermore, in a case where the telephone conversation ending signal from the telephone at the other end of line is received, the processor 30 also terminates the telephone conversation processing. In addition, in a case where the telephone conversation ending signal is received from the mobile communication network not from the telephone at the other end of line, the processor 30 also terminates the telephone conversation processing.

The microphone 20 shown in FIG. 1 is connected to the A/D converter 36, and as described above, the voice signal from the microphone 20 is converted into digital voice data by the A/D converter 36 to be input to the processor 30. On the other hand, the speaker 18 is connected to the D/A converter 38. The D/A converter 38 converts digital voice data into a voice signal to apply to the speaker 18 via an amplifier. Therefore, a voice of the voice data is output from the speaker 18.

In addition, the processor 30 can adjust, in response to an operation of a volume by the user, a voice volume of the voice output from the speaker 18 by controlling an amplification factor of the amplifier connected to the D/A converter 38.

The display driver 42 is connected to the display 14 and the processor 30, and image data that is output from the processor 30 is stored in a VRAM of the display driver 42. Then, the display driver 42 displays on the display 14 the image corresponding to image data in the VRAM. That is, the display driver 42 controls displaying by the display 14 that is connected to the display driver 42 under instructions of the processor 30. In addition, the display 14 is provided with a backlight that includes a light source of an LED or the like, for example, and the display driver 42 controls, according to the instructions of the processor 30, brightness, lighting on/off of the backlight.

The touch panel 16 shown in FIG. 1 is connected to a touch panel control circuit 48. The touch panel control circuit 48 applies to the touch panel 16 a necessary voltage or the like and inputs to the processor 30 a touch start signal indicating a start of a touch by the user to the touch panel 16, a touch end signal indicating an end of a touch by the user, and coordinates data indicating a touch position that the user touches. Therefore, the processor 30 can determine an icon or key that the user operates at that time based on the coordinate data.

In the embodiment, the touch panel 16 is of an electrostatic capacitance system that detects a change of an electrostatic capacitance between electrodes, which occurs when an object such as a finger is in close to a surface of the touch panel 16, and it is detected that one or more fingers are brought into contact with the touch panel 16, for example. Furthermore, the touch panel 16 is provided on the display 14, and serves as a pointing device for designating an arbitrary position within the screen. The touch panel control circuit 48 detects a touch operation within a touch-effective range of the touch panel 16, and outputs coordinate data indicative of a position of the touch operation to the processor 30. That is, the user inputs to the mobile phone 10 an operation position, an operation direction and so on through touch, release and slide operations or through a combination of these operations on the surface of the touch panel 16.

In addition, for a detection system of the touch panel 16, a surface-type electrostatic capacitance system may be adopted, or a resistance film system, an ultrasonic system, an infrared ray system, an electromagnetic induction system or the like may be adopted. Furthermore, a touch operation is not limited to an operation by a finger, may be performed by a stylus or the like.

An acceleration sensor 50 is a semiconductor-type 3-axis acceleration sensor. Therefore, the acceleration sensor 50 outputs to the processor 30 acceleration data of 3 axes (X, Y, Z) of the mobile phone 10. The processor 30 determines a motion that the mobile phone 10 is lifted or shaken by detecting a change of 3-axis acceleration data. Furthermore, the processor 30 can calculate an inclination angle of the mobile phone 10 by using a trigonometric function to the gravitational acceleration that the acceleration sensor 50 detects. Then, the processor 30 may set a displaying direction of the display 14 based on the calculated inclination angle depending on an operating state of the mobile phone 10.

Figure 3:
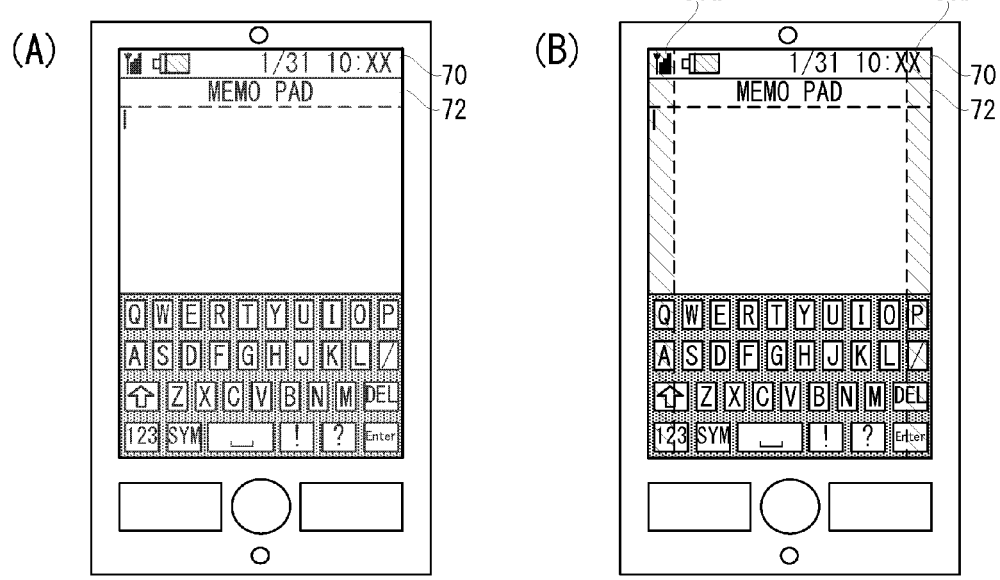
FIG. 3 is a schematic view showing an example of a screen displayed on a display shown in FIG. 1, wherein FIG. 3 (A) shows a state where the screen of a memo pad function is displayed and FIG. 3 (B) shows an operation inhibition area decided in advance.

FIG. 3 (A) is a schematic view showing an example of the displaying of the display 14. With reference to FIG. 3 (A), the display 14 includes a status displaying area 70 and a function displaying area 72. In the status displaying area 70, an icon (picto) showing a radio-wave receiving status by the antenna 34, an icon showing a residual battery capacity of a secondary battery and a day and time are displayed.

For example, a screen of a memo pad function is displayed on the functional display area 72 as an example of the displaying. The user can input arbitrary character strings using a QWERTY keyboard being displayed on the display 14.

With reference to FIG. 3 (B), operation inhibition areas 80a and 80b (if there is no necessity of distinguishing, hereafter, merely called the "operation inhibition area 80".) that make a touch operation invalid are set at a right side and a left side of the touch effective area of the touch panel 16. Accordingly, it is possible to prevent an erroneous operation that occurs due to an accidental touch of a finger, etc. to the touch panel 16 when holding the display 14.

However, as shown in FIG. 3 (B), depending on a function to be performed, there occurs a state where a key is included within the operation inhibition area 80 like a memo pad function and thus the user cannot operate such a key.

Accordingly, in this embodiment, the operation inhibition area 80 can be temporarily canceled so as to make the user enable to operate the key that is included in the operation inhibition area 80.

Figure 4:
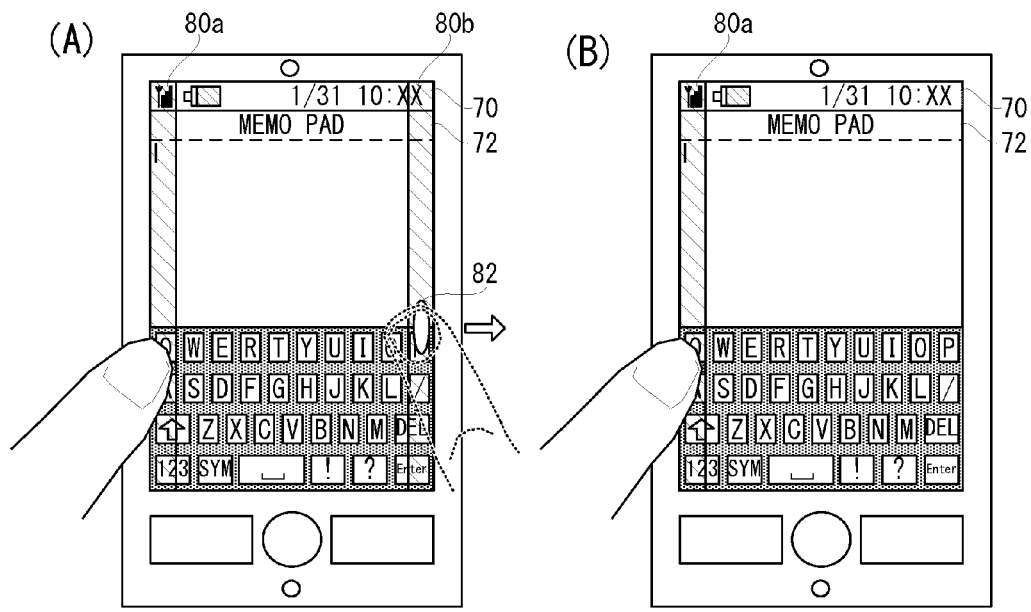
FIG. 4 is a schematic view showing an example of a procedure that temporarily cancels the operation inhibition area displayed on the display shown in FIG. 1, wherein FIG. 4 (A) shows a situation that an operation is performed to a temporary cancellation icon and FIG. 4 (B) shows a result that a part of operation inhibition area is canceled.

With reference to FIG. 4 (A), if a touch operation is detected in the operation inhibition area 80a, the operation inhibition area 80a and the operation inhibition area 80b become to be displayed on the display 14. Furthermore, if the touch operation to the operation inhibition area 80 is continued, a temporary cancellation icon 82 becomes to be displayed on the operation inhibition area 80 (here, the operation inhibition area 80b) that no touch operation is performed. Then, the user can cancel the operation inhibition area 80b temporarily if an operation (Flick operation) that flips the temporary cancellation icon 82 out of the screen is performed after touching to the icon.

With reference to FIG. 4 (B), if the operation inhibition area 80b is canceled temporarily, the displaying of the operation inhibition area 80b becomes to be non-displayed at the same time. Thus, the user can cancel the operation inhibition area temporarily while grasping the position that the operation inhibition area 80 is set. In particular, in this embodiment, it is possible to cancel an unnecessary part in the operation inhibition area 80 being displayed. Therefore, it is possible to increase a user's operability while preventing an erroneous operation.

Furthermore, since the cancellation icon 82 is displayed, it is possible to urge the user to perform an operation of temporarily canceling the operation inhibition area 80. Furthermore, since the cancellation icon 82 is displayed on the operation inhibition area 80 contrary to the operation inhibition area 80 that the touch operation is detected, an erroneous operation to the cancellation icon 82 can be prevented. In FIG. 4 (A), for example, if the temporary cancellation icon 82 is displayed on the operation inhibition area 80a, although the user does not have intention of the temporary cancellation icon 82, it may be in a state where the icon is touched. In addition, there is a possibility that the operation inhibition area 80a is canceled temporarily if the user lifts a finger in that state. In contrast, it is possible to prevent these problems by displaying the temporary cancellation icon 82 like this embodiment.

Figure 5:
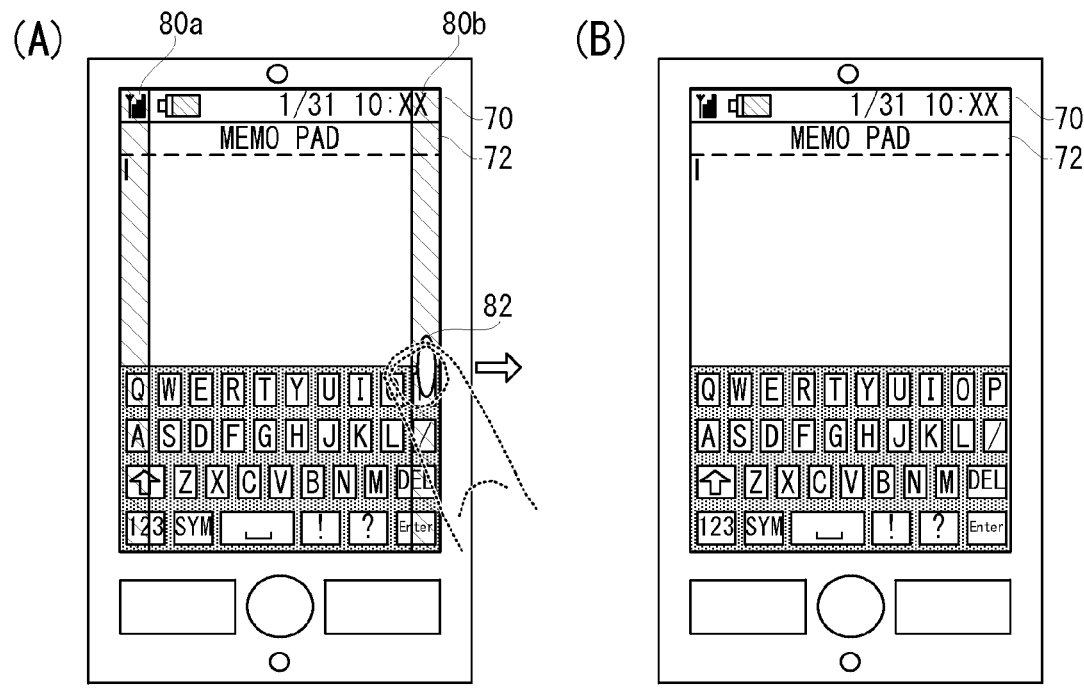
FIG. 5 is a schematic view showing another example of a procedure that temporarily cancels the operation inhibition area displayed on the display shown in FIG. 1, wherein FIG. 5 (A) shows another situation that an operation is performed to a temporary cancellation icon and FIG. 5 (B) shows a result that the operation inhibition area is entirely canceled.

With reference to FIGS. 5 (A) and (B), if a temporary cancellation operation is performed to the temporary cancellation icon 82 in the state where a touch operation is not performed to the operation inhibition area 80, the operation inhibition areas 80 is temporarily canceled entirely. In this case, the user can perform a touch operation without receiving restriction.

Furthermore, the operation inhibition area 80 is again non-displayed when a first predetermined time period (2 seconds, for example) elapses after displayed. That is, it is possible to restore the displaying state of the display 14.

Furthermore, the operation inhibition area 80 is re-set if a second predetermined time period (10 seconds, for example)

elapses after canceled temporarily. Accordingly, it is possible to prevent from leaving a state where the operation inhibition area 80 is canceled.

Furthermore, in this embodiment, in associated with a screen that is being displayed, the number of times that a temporary cancellation operation is performed is counted. Then, if the number of times of counting becomes equal to or more than a threshold value (3 times, for example), it is rendered that the operation inhibition area 80 cannot be set anymore on that screen.

With reference to FIG. 6, the number of times of counting is recorded in a temporary cancellation table. A column of screen information and a column of the number of times are included in a temporary cancellation table. The information of the screen that is displayed on the display 14, including a name or ID, etc. is recorded in the column of screen information. Furthermore, in associated with the screen information, the number of times that the temporary cancellation operation is performed is recorded in the column of the number of times.

In the temporary cancellation table shown in FIG. 6, for example, the number of times that the temporary cancellation operation is performed on the screen of "memo pad" is recorded as "2 times." Furthermore, the number of times that the temporary cancellation operation is performed on the screen of "e-mail preparing" and "browser" is recorded as "1 time", respectively.

Then, if the screen corresponding to the number of times is displayed in a state where the number of times equal to or more than the threshold value is recorded, the operation inhibition area 80 is not be set on that screen. Accordingly, since the operation inhibition area 80 is no longer set on the screen that a user frequently performs the temporary cancellation operation, a user's convenience improves.

Furthermore, the temporary cancellation table is initialized when a HOME screen that is also called an initial screen is displayed. Accordingly, it is possible to prevent a state where the operation inhibition area 80 is not set. When the number of times of being temporarily canceled is continuously counted, the operation inhibition area 80 may be set no longer on any screen. In such a case, an erroneous operation is no longer prevented by the operation inhibition area 80. Then, in order to prevent such a problem, the temporary cancellation table is initialized in this embodiment.

Furthermore, if the screen being displayed is switched by a user operation, etc. when the operation inhibition area 80 is being displayed, the operation inhibition area 80 of a previous screen is maintained while the operation inhibition area 80 is being touched. Then, if released in that state, the operation inhibition area 80 is set according to a next screen after switched. If the screen after switched is a screen of a browser function, etc., for example, the operation inhibition area 80 shown in FIG. 3 (B) is set. On the other hand, if the screen is an exceptional screen described later after switched, the operation inhibition area 80 is not set. Furthermore, the number of times that the temporary cancellation operation is performed is incremented in associated with the screen that the temporary cancellation operation is performed.

In addition, although the operation inhibition area 80 is temporarily canceled by the temporary cancellation operation to the temporary cancellation icon 82, the temporary cancellation may be performed by an operation that shakes the mobile phone 10. In this case, it is determined that the temporary cancellation operation is performed when the acceleration value that the acceleration sensor 50 outputs exceeds a threshold value.

Furthermore, the operation inhibition area 80 is not set on the exceptional screen such as a lock screen for canceling a screen lock.

Furthermore, even if it is in a state where the operation inhibition area 80 is being touched, the user can perform a touch operation to GUI (character key, etc.) within an effective area.

Although the features of the embodiment is outlined above, in the following, the embodiment will be described in detail using a memory map of the RAM 46 shown in FIG. 7 of the mobile phone 10 and flowcharts shown in FIGS. 8-10 for the processor 30 of the mobile phone 10.

Figure 7:
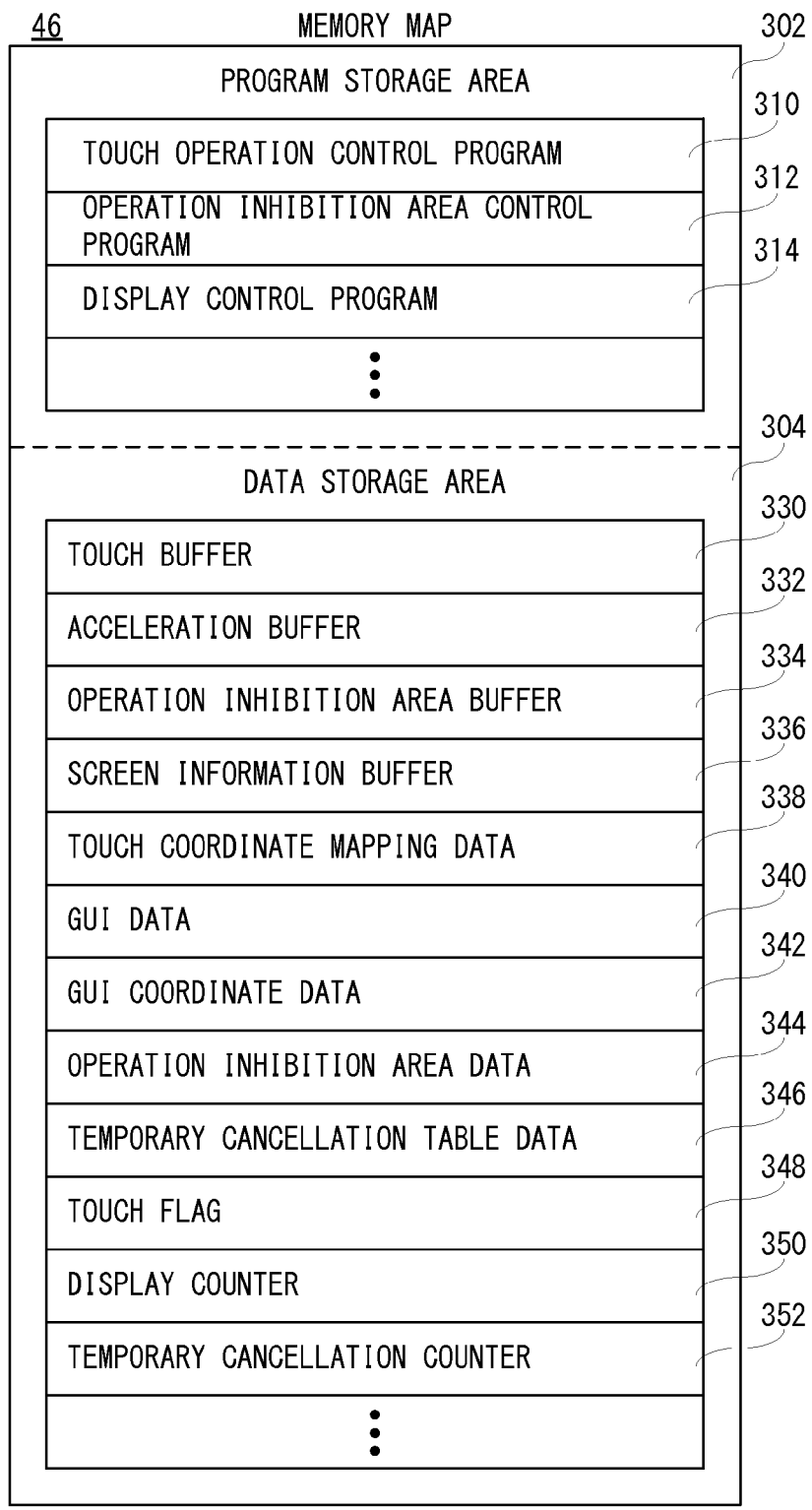
FIG. 7 is a schematic view showing an example of a memory map of a RAM shown in FIG. 2.

With reference to FIG. 7, a program storage area 302 and a data storage area 304 are formed in the RAM 46 shown in FIG. 2. The program storage area 302 is an area for reading and storing therein (developing) a part or all of program data that is set in advance in the flash memory 44 (FIG. 2), as described previously.

The program storage area 302 includes a touch operation control program 310 for determining whether processing according to a touch operation is to be performed, an operation inhibition area control program 312 for controlling the setting, and temporary cancellation of the operation inhibition area 80, etc., a display control program 314 for controlling displaying and non-displaying of the operation inhibition area 80, etc. In addition, the programs for executing a telephone function, etc. are also included in the program storage area 302.

The data storage area 304 of the RAM 46 is provided with a touch buffer 330, an acceleration buffer 332, an operation inhibition area buffer 334, a screen information buffer 336, etc. Furthermore, the data storage area 304 is stored with touch coordinate mapping data 338, GUI data 340, GUI coordinate data 342, operation inhibition area data 344, the temporary cancellation table data 346, etc. while provided with a touch flag 348, a display counter 350, a temporary cancellation counter 352, etc.

The touch buffer 330 is stored with touch coordinate data that is output from the touch panel control circuit 48. The acceleration buffer 332 is temporarily stored with an acceleration value that is output from the acceleration sensor 50. Coordinate data that indicates the operation inhibition area 80 being set is temporarily stored by the operation inhibition area buffer 334. In addition, when a part of operation inhibition area 80 is temporarily canceled, the coordinate data stored by the operation inhibition area buffer 334 is also rewritten.

Screen information at a time that the temporary cancellation operation is performed is temporarily stored in the screen information buffer 336. When counting the number of times that the temporary cancellation operation is performed is to be counted, the number of times is incremented based on the screen information. Accordingly, even if a screen being displayed is switched, it is possible to count the number of times in associated with the screen at a time that the temporary cancellation operation is performed.

The touch coordinate mapping data 338 is data for mapping the touch coordinate of the touch operation and the displaying coordinate of the display 14 with each other. That is, a result of the touch operation performed to the touch panel 16 is reflected in the displaying of the display 14 based on the touch coordinate mapping data 338.

The GUI data 340 includes image data and character string data for displaying the key(s), etc. that are to be displayed on the display 14. The GUI coordinate data 342 includes displaying coordinate data of the GUI that is being displayed. Therefore, it is determined, upon detecting the touch, whether the touch operation is performed to the GUI such as keys based on the touch coordinate being recorded on the touch buffer 330 and the GUI coordinate data.

The operation inhibition area data 344 is coordinate data of the operation inhibition area 80 that is determined in advance. Therefore, if a screen is displayed, the operation inhibition area 80 is set based on this data, and the coordinate data indicated by this data is temporarily recorded in the operation inhibition area buffer 334.

The temporary cancellation table data 346 is data of structure as shown in FIG. 6, and includes screen information and the number of times of being temporarily canceled is performed.

The touch flag 348 is a flag for determining whether the touch is being performed. The touch flag 348 is constructed by a 1-bit register, for example. If the touch flag 348 is turned-on (true), a data value "1" is set in the register. On the other hand, if the touch flag 348 is turned-off (false), a data value "0" is set in the register. Furthermore, the touch flag 348 is switched to on or off based on the output of the touch panel control circuit 48.

The display counter 350 is a counter for measuring a time period after the operation inhibition area 80 is displayed. Furthermore, if a first predetermined time period elapses after beginning measurement, the display counter 350 expires. Therefore, the display counter 350 is also called a display timer.

The temporary cancellation counter 352 is a counter for measuring a time period after the operation inhibition area 80 is temporarily canceled. Furthermore, if the second predetermined time period elapses after beginning measurement, the temporary cancellation counter 352 expires. Therefore, the temporary cancellation counter 352 is also called a temporary cancellation timer.

Furthermore, the display counter 350 and the temporary cancellation counter 352 respectively start the measurement when initialized.

In addition, the data storage area 304 is stored with image data to be displayed in a standby state, data of a character string, etc. are stored, and provided with counters required for an operation of the mobile phone 10 and flags required for an operation of the mobile phone 10.

Figure 8:
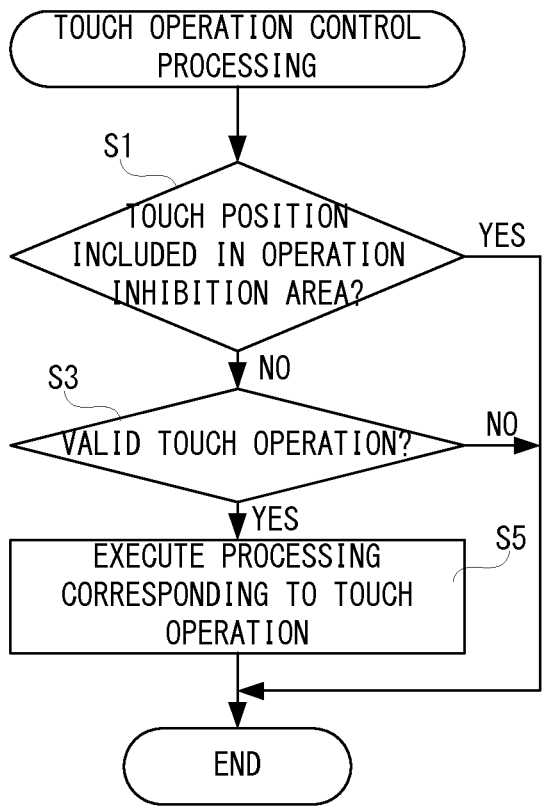
FIG. 8 is a flowchart showing an example of touch operation control processing by a processor shown in FIG. 2.
Figure 9:
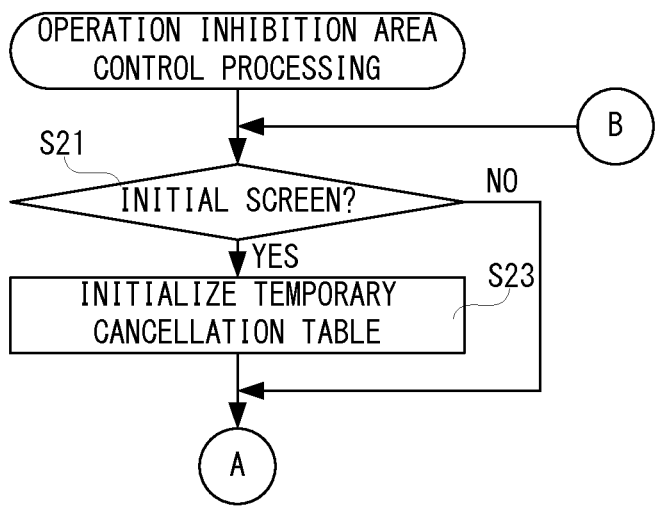
FIG. 9 is a flowchart showing an example of a part of operation inhibition area control processing by the processor shown in FIG. 2.
Figure 10:
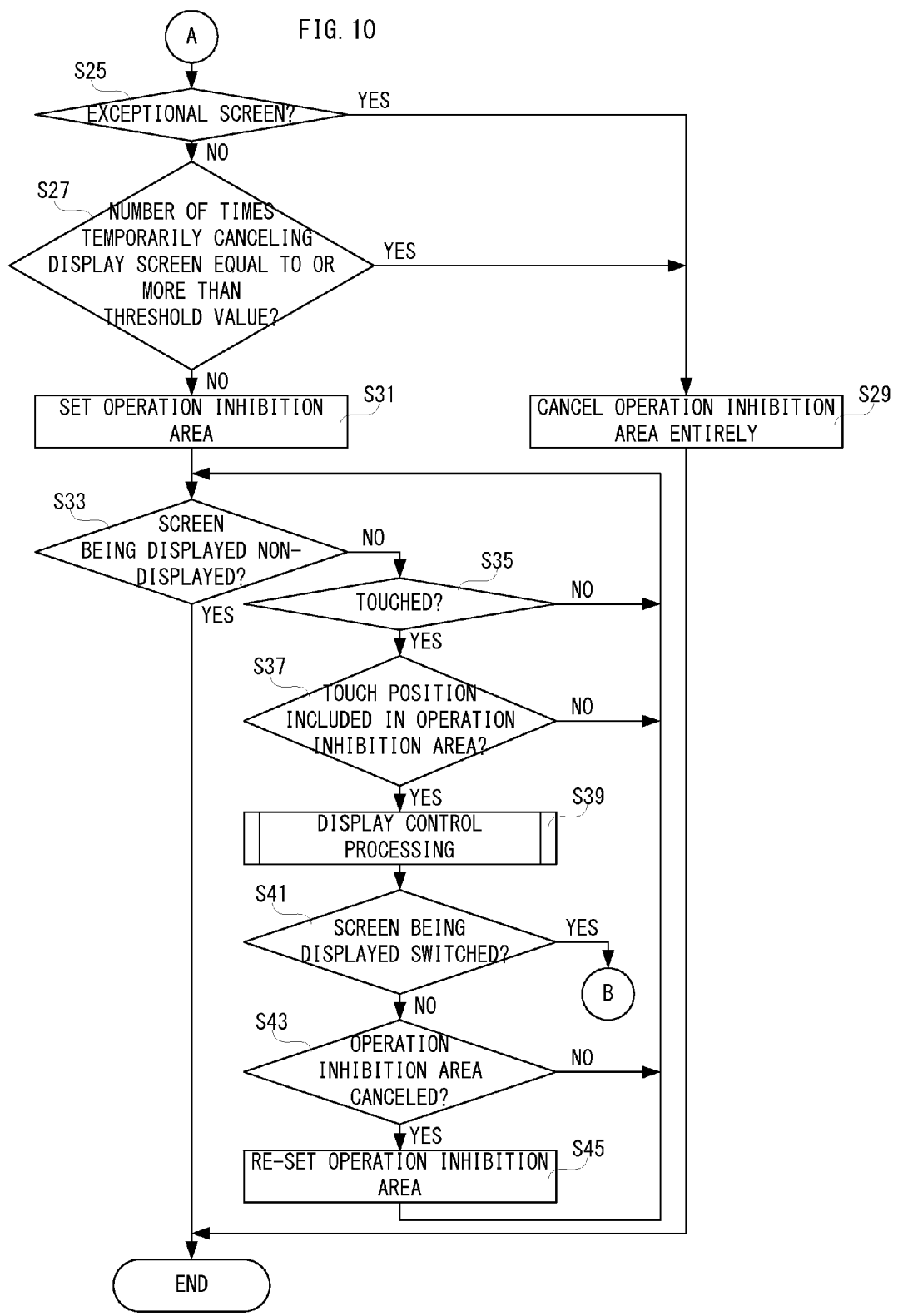
FIG. 10 is a flowchart showing an example of another part of the operation inhibition area control processing by the processor shown in FIG. 2, being a flowchart that follows FIG. 9.
Figure 11:
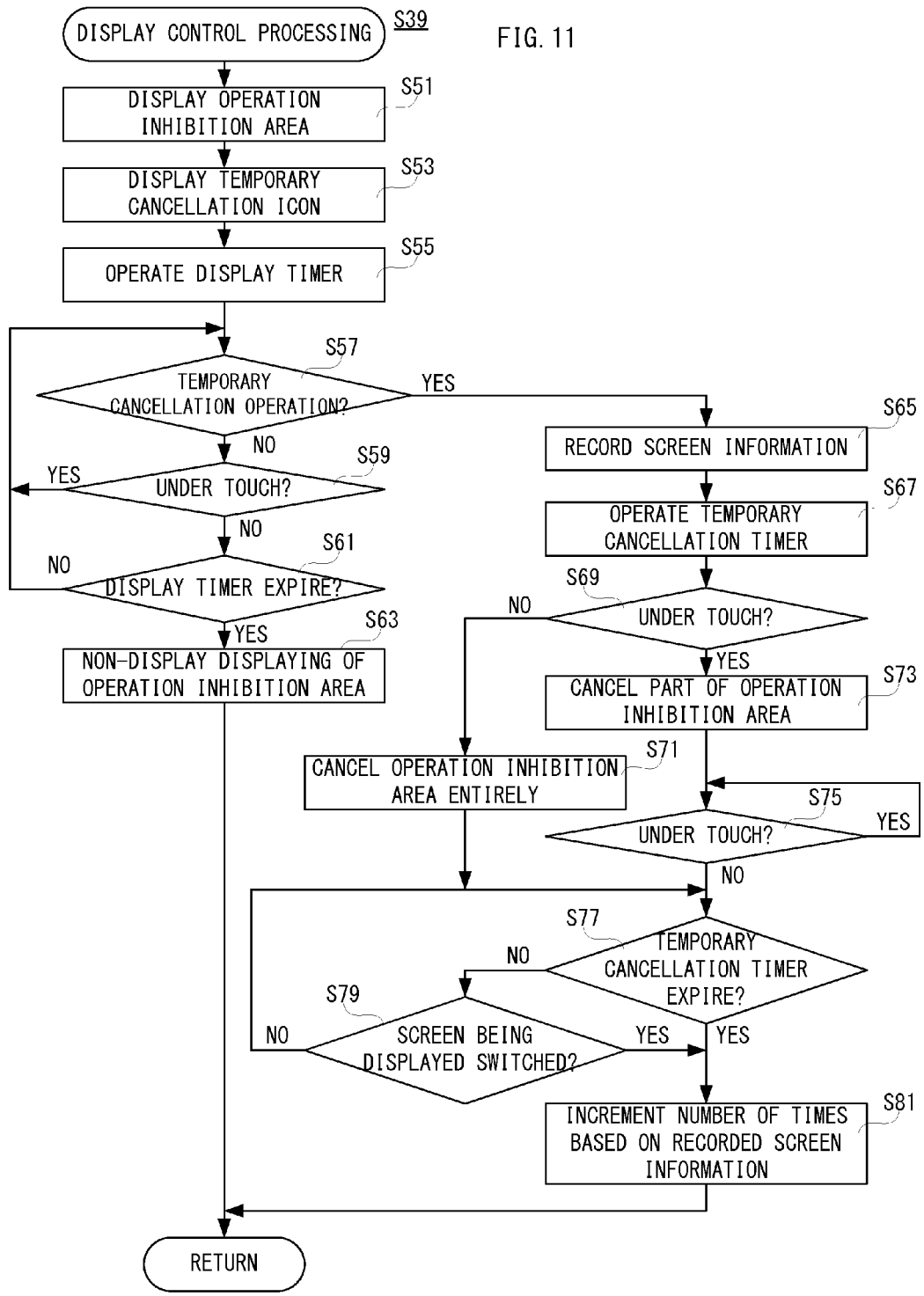
FIG. 11 is a flowchart showing an example of display control processing by the processor shown in FIG. 2.

The processor 30 processes a plurality of tasks including touch operation control processing shown in FIG. 8, operation inhibition area control processing shown in FIGS. 9 and 10, display control processing shown in FIG. 11, etc., in parallel with each other under controls of Linux (registered trademark)-base OS such as Android (registered trademark) and REX, or other OSs.

The touch operation control processing is started upon detection of a touch operation. The processor 30 determines whether the touch position is included within the operation inhibition area 80 in a step S1. That is, the processor 30 determines whether the coordinate indicating a current touch position stored in the touch buffer 330 is included in a coordinate range indicating the operation inhibition area 80. If "YES" is determined in the step S1, that is, the touch position is included in the operation inhibition area 80*a*, for example, the processor 30 terminates the touch operation control processing.

If "NO" is determined in the step S1, that is, if the touch operation is performed to an area other than the operation inhibition area 80, the processor 30 determines whether a valid touch operation is performed in a step S3. When the screen of the memo pad function shown in FIG. 3 is being displayed, for example, the processor 30 determines whether the touch is performed to the character key, etc. If "NO" is determined in the step S3, that is, if the touch operation is not performed to the GUI, for example, the processor 30 terminates the touch operation control processing.

If "YES" is determined in the step S3, that is, if the touch operation is performed to the GUI, for example, the processor 30 executes processing corresponding to the touch operation in a step S5. If the touch operation is performed to the character key, for example, a character corresponding to the character key is displayed on the display 14.

FIG. 9 is a flowchart of the operation inhibition area control processing. The operation inhibition area control processing is started when the display 14 is turned on or a display screen is switched and thus a new screen is displayed. The processor 30 determines whether the new screen is an initial screen in a step S21. The processor 30 determines whether a HOME screen, for example is displayed. If "NO" is determined in the step S21, that is, if a screen of another function is displayed, for example, the processor 30 proceeds to processing of a step S25 in FIG. 10.

On the other hand, if "YES" is determined in the step S21, that is, if the HOME screen is displayed, for example, the processor 30 initializes a temporary cancellation table in a step S23. That is, the screen information and the number of times included in the temporary cancellation table data 346 are erased. In addition, the processor 30 that executes the processing of the step S23 functions as an initialization module.

Subsequently, the processor 30 determines whether the screen is an exceptional screen in a step S25 in FIG. 10. It is determined whether a lock screen is being displayed on the display 14, for example. If "YES" is determined in the step S25, that is, if the lock screen is displayed, for example, the processor 30 proceeds to processing of step S29. On the other hand, if "NO" is determined in the step S25, that is, if a screen corresponding to the function currently executed is displayed, for example, the processor 30 determines whether the number of times that the display screen is temporarily canceled is equal to or more than a threshold value in a step S27. That is, the processor 30 determines whether the number of times that the screen being displayed is temporarily canceled, which the number of times being included in the temporary cancellation table data 346 is equal to or more than the threshold value.

If "YES" is determined in the step S27, that is, if the number of times that the screen being displayed is temporarily canceled is equal to or more than the threshold value, for example, the processor 30 cancels the operation inhibition area 80 entirely in a step S29. That is, the coordinate data stored in the operation inhibition area buffer 334 is erased. Accordingly, the operation inhibition area 80 becomes entirely in a state of the temporary cancellation. Then, if the processing of step S29 is ended, the processor 30 terminates the operation inhibition area control processing. In addition, the processor 30 that executes the processing of step S29 functions as an entire cancellation module.

On the other hand, if "NO" is determined in the step S27, that is, if the number of times that the screen being displayed is temporarily canceled is less than the threshold value, the processor 30 sets an operation inhibition area 80 in a step S31. That is, the processor 30 stores in the operation inhibition area data 334 the coordinate data stored in the operation inhibition area data 344.

Subsequently, the processor 30 determines whether the screen being displayed is non-displayed in a step S33. The processor 30 determines whether the screen currently displayed on the display 14 is non-displayed by an operation for switching the screen, an operation for turning the power supply of the display 14 off, etc., for example. If "YES" is determined in the step S33, that is, if the power supply of the display 14 is turned off and thus the screen being displayed is non-displayed, for example, the processor 30 terminates the operation inhibition area control processing.

Furthermore, if "NO" is determined in the step S33, that is, if there is no change in the displaying of the display 14, the processor 30 determines whether the touch operation is performed in a step S35. That is, it is determined whether the touch flag 348 is on. If "NO" is determined in the step S35, that is, if not touched, the processor 30 returns to the processing of the step S33. Furthermore, if "YES" is determined in the step S35, that is, if the touch operation is performed, the processor 30 determines in a step S37 whether the touch position is included within the operation inhibition area 80.

If "NO" is determined in the step S37, that is, if the position that is touched is not in the operation inhibition area 80, the processor 30 returns to the processing of the step S33. Furthermore, if "YES" is determined in the step S37, that is, if the operation inhibition area 80a is touched, for example, the processor 30 executes display control processing at the step S39. That is, the operation inhibition area 80 is displayed in the step S39. In addition, since the display control processing will be described later, a detailed description herein is omitted.

Subsequently, the processor 30 determines, in a step S41, whether the screen being displayed is switched. That is, it is determined whether the screen is switched at a time that the operation inhibition area 80 is being displayed. If "YES" is determined in the step S41, that is, if the screen being displayed is switched, the process returns to the processing of the step S21 (FIG. 9).

Furthermore, if "NO" is determined in the step S41, that is, if the screen being displayed is not switched, the processor 30 determines whether the operation inhibition area 80 is canceled in a step S43. That is, it is determined whether the operation inhibition area 80 is canceled by the temporary cancellation operation. If "NO" is determined in the step S43, that is, if the operation inhibition area 80 is not temporarily canceled, the process returns to the processing of the step S33. On the other hand, if "YES" is determined in the step S43, that is, if the operation inhibition area 80 is canceled temporarily, the processor 30 re-sets the operation inhibition area 80 in a step S45. That is, the coordinate data indicated by the operation inhibition area data 344 is recorded in the operation inhibition area buffer 334. Then, if the processing of the step S45 is ended, the processor 30 returns to the processing of the step S33. In addition, the processor 30 that executes the processing of the step S45 functions as a re-setting module.

The display control processing is started upon execution of the step S39 in FIG. 10. The processor 30 displays the operation inhibition area 80 in a step S51. For example, the processor 30 applies a predetermined color to a coordinate range that is stored in the operation inhibition area buffer 334 and makes transparency of the color high so that a background is visible. Accordingly, as shown in FIG. 4 (A), the operation inhibition area 80 is displayed. Subsequently, the processor 30 displays the temporary cancellation icon 82 in a step S53. As shown in FIG. 4 (A), for example, the temporary cancellation icon 82 is displayed within the operation inhibition area 80. Subsequently, the processor 30 operates the display timer in a step S55. That is, the display counter 350 is initialized.

In addition, the processor 30 that executes the processing of the step S51 functions as a display processing module. Furthermore, the processor 30 that executes the processing of the step S53 functions as an icon display processing module.

Subsequently, the processor 30 determines whether a temporary cancellation operation is performed in a step S57. For example, the processor 30 determines whether the touch operation is performed to the temporary cancellation icon 82. If "NO" is determined in the step S57, that is, if the temporary cancellation operation is not performed, the processor 30 determines whether under touch in a step S59. That is, it is determined whether it is a state where the touch operation inhibition area 80 is being touched by finger. If "YES" is determined in the step S59, that is, if under touch, the processor 30 returns to the processing of the step S57.

Furthermore, if "NO" is determined in the step S59, that is, if not touched, the processor 30 determines whether the display timer expires in a step S61. That is, it is determined whether the first predetermined time period elapses after the operation inhibition area 80 is displayed. If "YES" is determined in the step S61, that is, if the first predetermined time period elapses after the operation inhibition area 80 is displayed, the processor 30 non-displays the displaying of the operation inhibition area 80 in a step S63. As shown in FIG. 3 (A), for example, the displaying of the display 14 is restored. Then, if the processing of the step S63 is ended, the processor 30 terminates the display control processing and returns to the operation inhibition area control processing. In addition, the processor 30 that executes the processing of the step S63 functions as a non-displaying module.

On the other hand, if "NO" is determined in the step S61, the process returns to the processing of the step S57. Furthermore, if "YES" is determined in the step S57, that is, if the temporarily canceling operation is performed, the processor 30 records the screen information in a step S65. If the screen of the memo pad function is displayed, for example, the screen information on the screen is recorded in the screen information buffer 336. Subsequently, the processor 30 operates the temporary cancellation timer in a step S67. That is, the temporary cancellation counter 352 is initialized.

Subsequently, the processor 30 determines whether under touch in a step S69. That is, it is determined whether the operation inhibition area 80 is touched. If "NO" is determined in the step S69, that is, if the operation inhibition area 80 is not touched, the processor 30 cancels the operation inhibition area 80 entirely in a step S71. That is, as shown in FIGS. 5 (A) and (B), the operation inhibition areas 80a and 80b are non-displayed. At this time, the coordinate data stored in the operation inhibition area buffer 334 is erased. Then, if the processing of the step S71 is ended, the processor 30 proceeds to a processing of step S77.

On the other hand, if "YES" is determined in the step S69, that is, if the operation inhibition area 80a is touched as shown in FIG. 4 (A), for example, the processor 30 cancels a part of the operation inhibition area 80 in a step S73. The operation inhibition area 80b is canceled as shown in FIG. 4 (B), for example. Specifically, the coordinate data of the operation inhibition area 80b stored in the operation inhibition area buffer 334 is deleted.

In addition, the processor 30 that executes the processing of the step S71 and the step S73 functions as a cancellation module. Especially, the processor 30 that executes the processing of the step S71 functions as a first cancellation module, and the processor 30 that executes the processing of the step S73 functions as a second cancellation module.

Subsequently, the processor 30 determines whether under touch in a step S75. That is, it is determined whether the operation inhibition area 80 is continuously touched. If "YES" is determined in the step S75, that is, if under touch, the processor 30 repeats the processing of the step S75. On the other hand, if "NO" is determined in the step S75, that is, if a finger is lifted from the operation inhibition area 80, the processor 30 determines whether the temporary cancellation timer expires in a step S77. That is, it is determined whether the second predetermined time period elapses after at least a part of the operation inhibition area 80 is canceled. If "NO" is determined in the step S77, that is, if the second predetermined time period does not elapse, the processor 30 determines whether the screen being displayed is switched in a step S79. That is, the processor 30 determines whether the screen information on the screen being displayed differs from the screen information recorded in the screen information buffer 336. If "NO" is determined in the step S79, that is, if the screen is not switched, the processor 30 returns to the processing of the step S77.

If "YES" is determined in the step S77, that is, if the second predetermined time period elapses after the temporary cancellation is performed, the processor 30 increments, in a step S81, the number of times based on the screen information recorded. If the screen of the memo pad is displayed and the screen is not switched, for example, in the temporary cancellation table data 346, the number of times corresponding to the screen information of the screen of the memo pad is incremented.

Furthermore, if "YES" is determined in the step S79, that is, if the screen is switched, the processor 30 increments, in a step S81, the number of times based on the screen information recorded. If switched from the screen of the memo pad function to a browser function, for example, since the screen information of the screen of the memo pad function is recorded in the screen information buffer 336, the number of times corresponding to the screen information of the memo pad function is incremented. That is, the number of times is incremented in associated with the screen information of the screen that is displayed previously. Then, if the processing of the step S81 is ended, the processor 30 terminates the display control processing and returns to the operation inhibition area control processing. In addition, the processor 30 that executes the processing of the step S81 functions as a count module.

Second Embodiment

In the second embodiment, if the operation inhibition area 80 that is being touched is canceled, a touch area is set as a new operation inhibition area 80.

Figure 12:
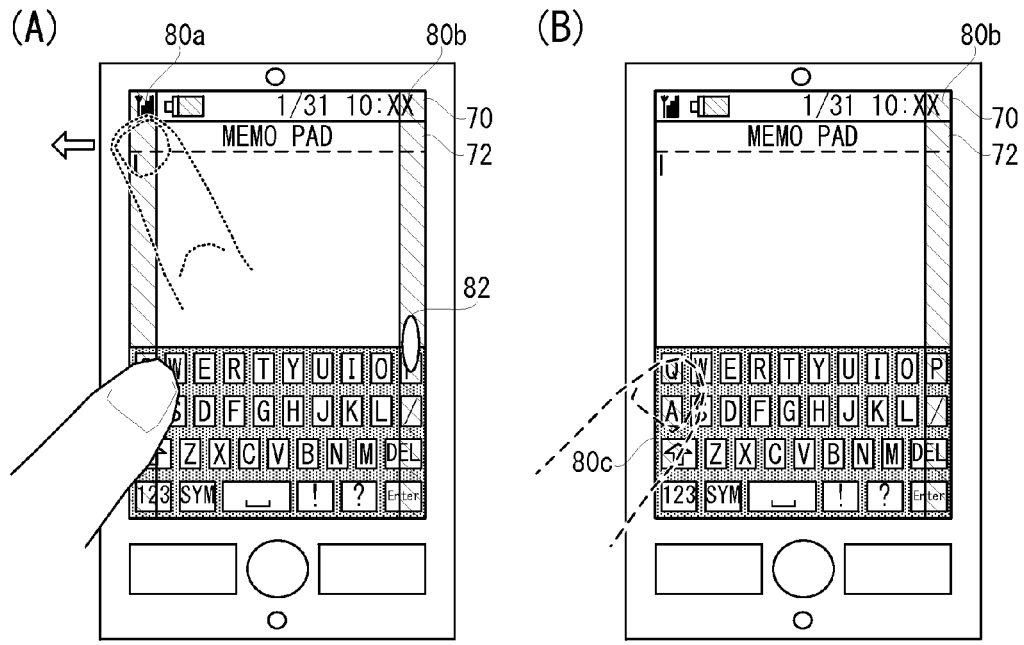
FIG. 12 is a schematic view showing the other example of a procedure that temporarily cancels the operation inhibition area displayed on the display shown in FIG. 1, wherein FIG. 12 (A) shows a situation that a temporary cancellation operation is performed and FIG. 12 (B) shows a result that a part of operation inhibition area is canceled.

With reference to FIG. 12, if a touch operation (Flick operation) that flips out of the screen in the operation inhibition area 80a with a right finger is performed in a state where a part of the operation inhibition area 80a is touched with a left finger, a touch area that is touched with the left finger is set as a new operation inhibition area 80c while the operation inhibition area 80a that is not touched is canceled. Accordingly, the user can set the operation inhibition area 80 at an arbitrary position.

In addition, in another embodiment, the operation inhibition area 80 other than the operation inhibition area 80c that is newly set may be canceled entirely.

Furthermore, in the other embodiment, once canceling the operation inhibition area 80a being touched, a touch area may be set as an operation inhibition area 80c.

Figure 13:
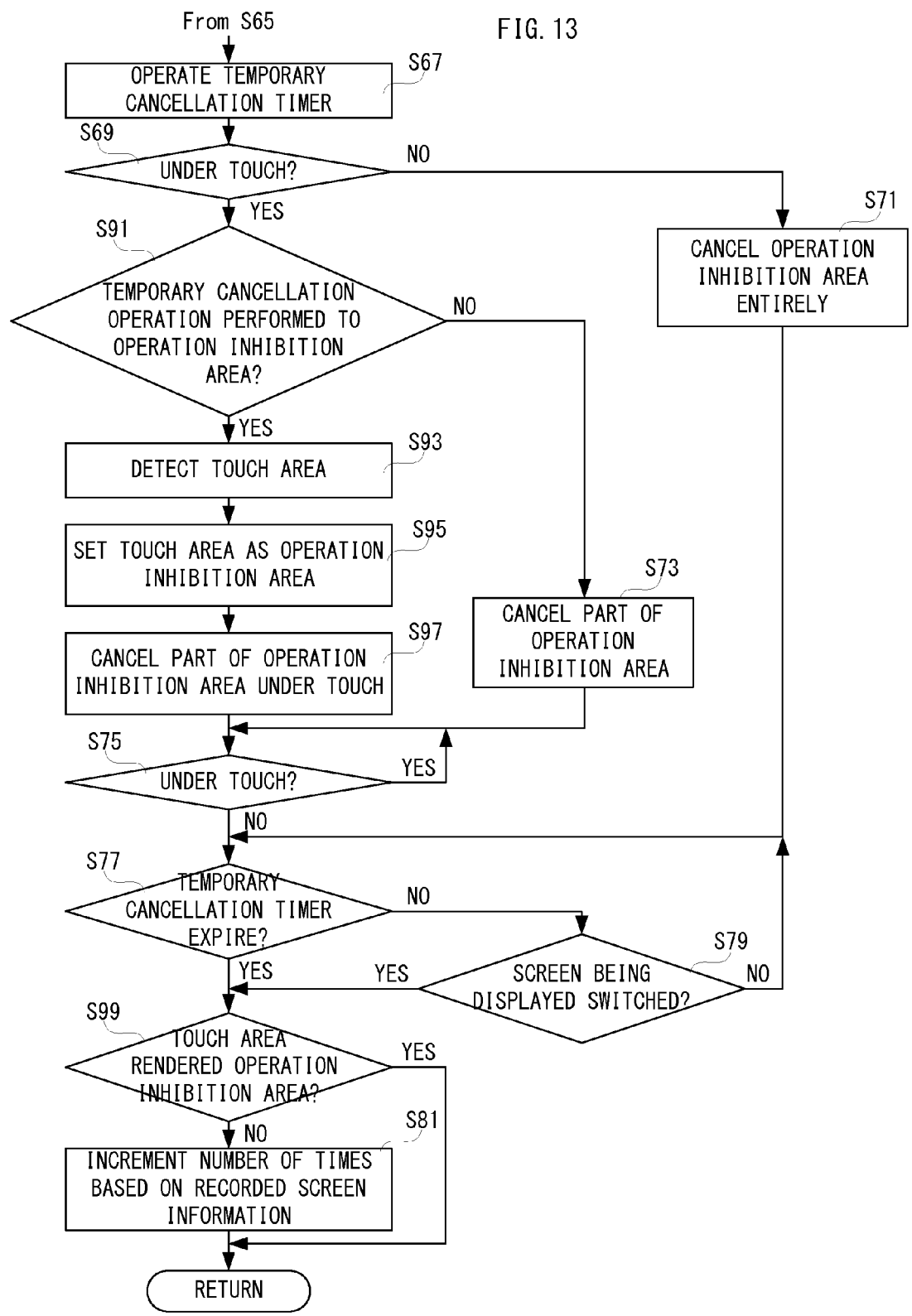
FIG. 13 is a flowchart showing an example of another part of the display control processing by the processor shown in FIG. 2, being a flowchart that follows FIG. 11.

FIG. 13 is a part of flowchart of the display control processing according to the second embodiment. In addition, since steps S51-S63 are the same as those of the first embodiment, illustration is omitted. Furthermore, in FIG. 13, the same step numbers are applied to the same processing as those of the first embodiment.

If the processing of step S65 is executed in the display control processing of the second embodiment, the processor 30 operates a temporary cancellation timer in a step S67, and determines whether under touch in a step S69. If not touched at this time, the processor 30 proceeds to processing of a step S77 after executing processing of a step S71.

Furthermore, if the operation inhibition area 80 is touched, the processor 30 determines, in a step S91, whether that the temporary cancellation operation is performed to the operation inhibition area 80 being touched. As shown in FIG. 12 (A), for example, it is determined whether a touch operation of the temporary cancellation is performed to the operation inhibition area 80 being touched. If "NO" is determined in the step S91, that is, if the temporary cancellation operation is performed to the operation inhibition area 80b that is not touched as shown in FIG. 4 (A), for example, the processor 30 cancels a part of the operation inhibition area 80 in a step S73, and proceeds to processing of a step S75. As shown in FIGS. 4 (A) and (B), for example, the operation inhibition area 80b is canceled.

Furthermore, if "YES" is determined in the step S91, that is, if the temporary cancellation operation is performed to the operation inhibition area 80a under touch as shown in FIG. 12 (A), for example, the processor 30 detects a touch area in a step S93. A range that is touched is read from the touch buffer 330, for example. Subsequently, the processor 30 sets the touch area as an operation inhibition area 80 in a step S95. As shown in FIG. 12 (B), for example, the area that is touched with a finger is set as the new operation inhibition area 80c. Subsequently, the processor 30 cancels a part of the operation inhibition area 80 being touched in a step S97. As shown in FIG. 12 (B), for example, an area that is not touched in the operation inhibition area 80a that is being touched is canceled. In addition, the processor 30 that executes the processing of the step S95 functions as a setting module.

Subsequently, the processor 30 processes the steps S75, S77 and S79, respectively. Then, if "YES" is determined in the step S77 or step S79, the processor 30 determines, in a step S99, whether the touch area is made into the operation inhibition area 80. That is, the processor 30 determines whether the coordinate of the touch area is stored in the operation inhibition area buffer 334.

If "NO" is determined in the step S99, that is, if the touch area is not made into the operation inhibition area 80 like the first embodiment, for example, the processor 30 increments, in the step S81, the number of times that the operation inhibition area 80 is canceled based on the screen information recorded. Then, if the processing of the step S81 is ended, the processor 30 terminates the display control processing and returns to the operation inhibition area control processing.

Furthermore, if "YES" is determined in the step S99, that is, if the touch area is made into the operation inhibition area 80c as shown FIG. 12 (B), for example, the processor 30 terminates the display control processing. That is, if the touch area is made into the new operation inhibition area 80, the number of times is not incremented. This is because there is no necessity of counting as the number of times that the operation inhibition area 80 is canceled since it means that the operation inhibition area 80 is re-set in the second embodiment.

Figure 14:
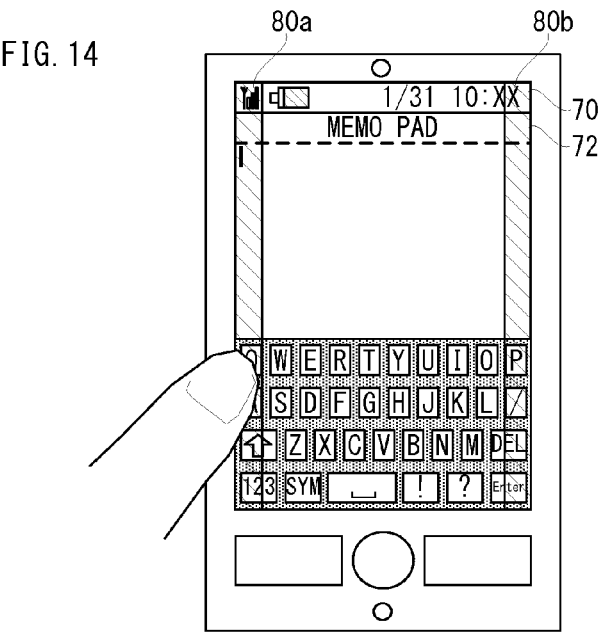
FIG. 14 is a schematic view showing a state where the operation inhibition area is being displayed on the display shown in FIG. 1.

In addition, in another embodiment, the operation inhibition area 80 may be displayed to serve also as the temporary cancellation icon 82. In this case, the step S53 in the display control processing is skipped, and as shown in FIG. 14, the temporary cancellation icon 82 is no longer displayed on the display 14. Accordingly, when the GUI (key), etc. is displayed on the operation inhibition area 80, a user becomes legible about the GUI.

Furthermore, after the operation inhibition area 80 is canceled, the temporary cancellation timer may be initialized for each time that the touch operation is performed. That is, it is possible to prevent the operation inhibition area 80 from being re-set while the user is performing a touch operation.

Furthermore, the user may be made to arbitrarily change the position and size of the operation inhibition area 80. Furthermore, the user may be made to register an arbitrary screen as an exceptional screen.

The programs used in the embodiments may be stored in an HDD of the server for data distribution, and distributed to the mobile phone 10 via the network. A plurality of programs may be stored in a storage medium such as an optical disk of CD, DVD, BD (Blu-ray Disc) or the like, a USB memory, a memory card, etc., and then, such the storage medium may be sold or distributed. In a case where the programs downloaded via the above-described server or storage medium are installed to a portable terminal having the structure equal to the structure of the embodiments, it is possible to obtain advantages equal to the advantages according to the embodiments.

The specific numerical values mentioned in this specification are only examples, and changeable appropriately in accordance with the change of product specifications.

It should be noted that reference numerals inside the parentheses and the supplements show one example of a corresponding relationship with the embodiments described above for easy understanding of the present invention, and do not limit the present invention.

An embodiment is a portable terminal that has a case, a display portion provided on the case so as to be rendered as a narrow frame and a touch panel that receives a touch operation, wherein an operation inhibition area is set in at least a part of a periphery of a touch effective area, comprising: a display processing module operable to display the operation inhibition area when the operation inhibition area is touched; and a cancellation module operable to cancel at least a part of the operation inhibition area when a cancellation operation is performed in a state where the operation inhibition area is being displayed.

In this embodiment, the portable terminal (10: reference numeral exemplifying a module corresponding in the embodiment, and so forth) has a case (12) that is also called a housing. This case is provided with the display portion (14) that is a display so as to be rendered a narrow frame, for example. Furthermore, a touch panel (16) is provided on a displaying surface of the display portion. Furthermore, the operation inhibition area (80*a*, 80*b*) is set to right and left sides on the periphery of the touch effective area of the touch panel, for example. The display processing module (30, S39: S51) displays the operation inhibition area when an operation inhibition area is touched due to an erroneous operation, for example. The cancellation module (30, S71, S73) cancels at least a part of the operation inhibition area if the cancellation operation is performed in a state where the operation inhibition area is being displayed.

According to this embodiment, the user can grasp the position that the operation inhibition area is set and cancel at lease a part thereof.

In another embodiment, the cancellation module includes a first cancellation module that cancels the operation inhibition area entirely when the cancellation operation is performed in a state where the operation inhibition area is not touched.

In this embodiment, the first cancellation module (30, S71) cancels the operation inhibition area entirely if the cancellation operation is performed when the operation inhibition area is not touched.

According to this embodiment, the user can perform a touch operation without receiving restriction.

In a further embodiment, the cancellation module further includes a second cancellation module that cancels a part of the operation inhibition area when the cancellation operation is performed in a state where the operation inhibition area is being touched.

In the further embodiment, the second cancellation module (30, S73) cancels the operation inhibition area that is not touched if the cancellation operation is performed when the operation inhibition area is being touched, for example.

According to the further embodiment, in the operation inhibition area that is currently displayed, an unnecessary part can be canceled. Therefore, it is possible to increase a user's operability while preventing an erroneous operation.

A still further embodiment further comprises a setting module operable to set an area that is being touched as an operation inhibition area, wherein the second cancellation module cancels at least a part of the operation inhibition area while leaving the operation inhibition area that is set by the setting module.

In the still further embodiment, if the cancellation operation is performed to the operation inhibition area that is being touched, the setting module (30, S95) sets a touch area as an operation inhibition area (80*c*). Then, the second cancellation module cancels the operation inhibition area (80*a*) being touched while leaving the newly set operation inhibition area.

According to the still further embodiment, the user can set an operation inhibition area at an arbitrary position.

A yet further embodiment further comprises a non-displaying module operable to non-display the displaying of the operation inhibition area when a first predetermined time period elapses after the operation inhibition area is displayed.

In the yet further embodiment, the non-displaying module (30, S63) non-displays the displaying of the operation inhibition area if the first predetermined time period elapses after the operation inhibition area is displayed.

According to the yet further embodiment, it is possible to restore a displaying state of the display portion.

A yet still further embodiment further comprises a re-setting module operable to re-set an operation inhibition area if the operation inhibition area is not touched when a second predetermined time period elapses after at least a part of the operation inhibition area is canceled.

In the yet still further embodiment, the re-setting module (30, S45) re-sets an operation inhibition area if the touch operation is not performed to the operation inhibition area when the second predetermined time period elapse after the operation inhibition area is canceled, for example.

According to the yet still further embodiments, it is possible to prevent a state where the operation inhibition area remains being canceled.

A further embodiment further comprises an icon display processing module operable to display a cancellation icon when the operation inhibition area is displayed, wherein the cancellation module cancels at least a part of the operation inhibition area when a cancellation operation is performed in a state where the icon is being displayed.

In the further embodiment, the icon display processing module (30, S53) displays the cancellation icon (82) within the operation inhibition area, for example. Then, if the cancellation operation is performed when the icon is being displayed, at least a part of the operation inhibition area is canceled.

According to the further embodiment, it is possible to urge the user a cancellation operation by displaying the icon.

In a still further embodiment, the operation inhibition area is displayed to serve also as the icon.

According to the still further embodiment, when a GUI, etc. is being displayed on the operation inhibition area, the user becomes legible about the GUI.

In a yet still further embodiment, the operation inhibition area includes a first operation inhibition area and a second operation inhibition area, and the icon display processing module displays the icon within the second operation inhibition area when the touch operation is performed to the first operation inhibition area, and when touch operation is performed to the second operation inhibition area, the icon is displayed within the first operation inhibition area.

In the yet still further embodiment, the first operation inhibition area (80a) is provided at a left side of the display portion, and the second operation inhibition area (80b) is provided at a right side, for example. The icon is displayed on the second operation inhibition area when the touch operation is performed to the first operation inhibition area, and displayed on the first operation inhibition area when the touch operation is performed to the second operation inhibition area.

According to the yet still further embodiment, it is possible to prevent an erroneous operation to the icon by displaying the icon on an operation inhibition area contrary to the operation inhibition area that the touch operation is detected.

A further embodiment further comprises a count module operable to count, when the operation inhibition area is canceled by the cancellation module, a number of times of being canceled in associated with a screen that is being displayed on the display portion; a storing module operable to store the number of times counted by the count module in associated with the screen at that time; and an entire cancellation module operable to entirely cancel the operation inhibition area when the number of times being stored in associated with the screen is equal to or more than a threshold value.

In the further embodiment, if the operation inhibition area is canceled when the screen of the memo pad function is displayed, for example, the count module (30, S81) counts the number of times of having been canceled in associated with the screen of the memo pad function. The storing module (46) stores the number of times counted by the count module and the screen at that time in associated with each other in a data format of a table, for example. If the number of times of being canceled is equal to or more than the threshold value when the screen of the memo pad function is displayed, for example, the operation inhibition areas is entirely canceled in the screen of the memo pad function by the entire cancellation modules (30, S29).

According to the further embodiment, since the operation inhibition area becomes not be set in the screen that the user frequently performs a temporary cancellation, a user's convenience improves.

In a still further embodiment, the display portion displays an initial screen, and an initialization module operable to initialize the number of times being stored in the storing module when the initial screen is displayed by the display portion is further provided.

In the still further embodiment, the display portion displays the initial screen called a HOME screen, for example, if a power supply is turned on. The initialization module (30, S23) initializes the number of times of cancellation stored by the storing module when the initial screen is displayed.

According to the still further embodiment, it is possible to prevent a state where the operation inhibition area cannot be set.

The other embodiment is an operation inhibition control method in a portable terminal (10) that has a case (12), a display portion (14) provided on the case and a touch panel (16) that receives a touch operation, wherein an operation inhibition area (80a, 80b) is set in at least a part of a periphery of a touch effective area, a processor of the portable terminal performs following steps of: displaying (S39, S51) the operation inhibition area when the operation inhibition area is touched; and canceling (S71, S73) at least a part of the operation inhibition area when a cancellation operation is performed in a state where the operation inhibition area is being displayed.

According to also the other embodiment, the user can grasp the position that the operation inhibition area is set and cancel at lease a part thereof.

Although the present invention has been described and illustrated in detail, it is clearly understood that the same is by way of illustrative and example only and is not to be taken by way of limitation, the spirit and scope of the present invention being limited only by the terms of the appended claim.

DESCRIPTION OF NUMERALS

10—mobile phone
14—display
16—touch panel
30—processor
40—input device
44—flash memory
46—RAM
48—touch panel control circuit
50—acceleration sensor

The invention claimed is:

1. A portable terminal that has a case, a display provided on the case, and a touch panel that receives a touch operation, wherein an operation inhibition area is set in at least a part of a periphery of a touch effective area, the portable terminal comprising:
at least one processor that
displays the operation inhibition area on the display when the operation inhibition area is touched; and
cancels at least a part of the operation inhibition area when a cancellation operation is performed in a state where the operation inhibition area is being displayed, wherein the at least one processor cancels the operation inhibition area entirely when the cancellation operation is performed in a state where the operation inhibition area is not touched.

2. A portable terminal that has a case, a display provided on the case, and a touch panel that receives a touch operation, wherein an operation inhibition area is set in at least a part of a periphery of a touch effective area, the portable terminal comprising:
at least one processor that
displays the operation inhibition area on the display when the operation inhibition area is touched;
cancels at least a part of the operation inhibition area when a cancellation operation is performed in a state where the operation inhibition area is being displayed, wherein the at least one processor cancels a part of the operation inhibition area when the cancellation operation is performed in a state where the operation inhibition area is being touched; and
sets a first part of the operation inhibition area that is being touched as the operation inhibition area, wherein the at least one processor cancels at least a second part of the operation inhibition area while leaving the first part of the operation inhibition area that has been set.

3. A portable terminal that has a case, a display provided on the case, and a touch panel that receives a touch operation, wherein an operation inhibition area is set in at least a part of a periphery of a touch effective area, the portable terminal comprising:
- at least one processor that
  - displays the operation inhibition area on the display when the operation inhibition area is touched;
  - cancels at least a part of the operation inhibition area when a cancellation operation is performed in a state where the operation inhibition area is being displayed; and
  - non-displays the displaying of the operation inhibition area when a first predetermined time period elapses after the operation inhibition area is displayed.

4. A portable terminal that has a case, a display provided on the case, and a touch panel that receives a touch operation, wherein an operation inhibition area is set in at least a part of a periphery of a touch effective area, the portable terminal comprising:
- at least one processor that
  - displays the operation inhibition area on the display when the operation inhibition area is touched;
  - cancels at least a part of the operation inhibition area when a cancellation operation is performed in a state where the operation inhibition area is being displayed; and
  - resets an operation inhibition area if the operation inhibition area is not touched when a second predetermined time period elapses after at least a part of the operation inhibition area is canceled.

5. A portable terminal that has a case, a display provided on the case, and a touch panel that receives a touch operation, wherein an operation inhibition area is set in at least a part of a periphery of a touch effective area, the portable terminal comprising:
- at least one processor that
  - displays the operation inhibition area on the display when the operation inhibition area is touched;
  - cancels at least a part of the operation inhibition area when a cancellation operation is performed in a state where the operation inhibition area is being displayed; and
  - displays a cancellation icon when the operation inhibition area is displayed,
- wherein the at least one processor cancels at least a part of the operation inhibition area when a cancellation operation is performed in a state where the icon is being displayed.

6. The portable terminal according to claim 5, wherein the operation inhibition area is displayed to serve also as the icon.

7. The portable terminal according to claim 5, wherein the operation inhibition area includes a first operation inhibition area and a second operation inhibition area, and
- the at least one processor displays the icon within the second operation inhibition area when the touch operation is performed to the first operation inhibition area, and
- when the touch operation is performed to the second operation inhibition area, the icon is displayed within the first operation inhibition area.

8. A portable terminal that has a case, a display provided on the case, and a touch panel that receives a touch operation, wherein an operation inhibition area is set in at least a part of a periphery of a touch effective area, the portable terminal comprising:
- at least one processor that
  - displays the operation inhibition area on the display when the operation inhibition area is touched;
  - cancels at least a part of the operation inhibition area when a cancellation operation is performed in a state where the operation inhibition area is being displayed;
  - when the operation inhibition area is canceled, counts a number of times of being canceled in association with a screen that is being displayed on the display;
  - stores the number of times counted in association with the screen at that time; and
  - entirely cancels the operation inhibition area when the number of times being stored in association with the screen is equal to or more than a threshold value.

9. The portable terminal according to claim 8, wherein the at least one processor further displays an initial screen on the display, and initializes the number of times being stored when the initial screen is displayed.

* * * * *